United States Patent
Minoura

[11] 4,139,267
[45] Feb. 13, 1979

[54] LENS HAVING HIGH RESOLVING POWER

[75] Inventor: Kazuo Minoura, Yokohama, Japan

[73] Assignee: Canon Kabushiki Kaisha, Tokyo, Japan

[21] Appl. No.: 748,197

[22] Filed: Dec. 7, 1976

[30] Foreign Application Priority Data

Dec. 11, 1975 [JP] Japan .................. 50/147860

[51] Int. Cl.$^2$ ............... G02B 9/34; G02B 9/16
[52] U.S. Cl. ................. 350/223; 350/176; 350/226
[58] Field of Search ............. 350/223, 226, 176

[56] References Cited

U.S. PATENT DOCUMENTS

| | | | |
|---|---|---|---|
| 2,541,485 | 2/1951 | Schade et al. | 350/223 |
| 3,160,700 | 12/1964 | Snyder | 350/226 X |
| 3,633,985 | 1/1972 | Mouchart | 350/223 X |

FOREIGN PATENT DOCUMENTS

| | | | |
|---|---|---|---|
| 966007 | 3/1950 | France | 350/226 |
| 45-39432 | 12/1970 | Japan | 350/226 |
| 563359 | 8/1944 | United Kingdom | 350/223 |
| 579521 | 8/1946 | United Kingdom | 350/223 |

OTHER PUBLICATIONS

IBM Technical Disclosure Bulletin, vol. 11, No. 9, p. 1175, 2-1969.

Primary Examiner—Paul A. Sacher
Attorney, Agent, or Firm—Toren, McGeady and Stanger

[57] ABSTRACT

A lens which has a first positive lens group consisting of one or more positive lens or lenses, a second negative lens being a negative meniscus lens having its concave surface facing an object side, and a third positive lens having its convex surface facing an object side, being positioned in said order from an object side, and obtains high resolving power by satisfying:

$$0.8 < R/L$$

wherein L is an air space on an axis between said second negative lens and said third positive lens and R is a radius of curvature of the surface of the third positive lens at the object side, and $$-0.18/F < 1/Rb < 0.18/F$$

wherein Rb is a radius of curvature of a surface of said third positive lens at an image plane side and F is a focal distance of the total lens system.

6 Claims, 4 Drawing Figures

LENS HAVING HIGH RESOLVING POWER

BACKGROUND OF THE INVENTION

The present invention relates to a such lens having high resolving power as reading out the information from an object in which information is recorded with high degree of density.

A lens having high resolving power is required in a device to optically read out information using laser beam, etc. out of an information carrier in which a large volume of information is housed as in a video-disk which is becoming very popular. If a conventional miroscopic objective lens is used as a lens having high resolving power, its heavy weight presents a problem and its practical use is difficult. That is this type of lens is required to have small size, light weight and comparatively long working distance beside high resolving power. Therefore, aberration must be so corrected as exhibiting high resolving power with as simple set up as possible.

SUMMARY OF THE INVENTION

It is an object of the present invention to provide a lens having high resolving power with simple set up, eliminating said difficulties.

In a lens system according to the present invention, a first positive lens group consisting of one or more positive lens or lenses, a second negative lens which is a negative meniscus lens having its concave surface facing an object side, and a third positive lens which is a positive lens having its convex surface facing an object side are positioned in said order from an object side.

Further in a lens system according to the present invention, when the air space on an axis between said second negative lens and said third positive lens is represented by L and a radius of curvature of a surface of said third positive lens at an object side is represented by R, an inequality, $0.8 < R/L$ is satisfied, while when a radius of curvature of a surface of said third positive lens at an image plane side is represented by Rb, and a focal distance of an entire lens system is represented by F, an inequality, $-0.18/F < 1/Rb < 0.18/F$ is satisfied.

Since a lens system in the present invention is to read out information from something like a video-disk, etc. as mentioned above, a certain spot in an object may be precisely imaged out by a lens system. Therefore, in a lens system according to the present invention, when aberrations on an axis out of various aberrations of a lens are satisfactorily corrected, for example spherical aberration and sine condition are satisfactorily corrected, a lens having high resolving power can be obtained.

As mentioned above, set up and arrangement of a lens system are simplified and such correction of aberrations are made as enhancing the resolving power. Further, the numerical aperture is made large for providing high resolving power. In the examples to be described later, with focal distance of 10 mm and numerical aperture of 0.5, spherical aberration and sine condition can be satisfactorily corrected.

DETAILED DESCRIPTION OF THE PREFERRED EMBODIMENT

Figure 1:
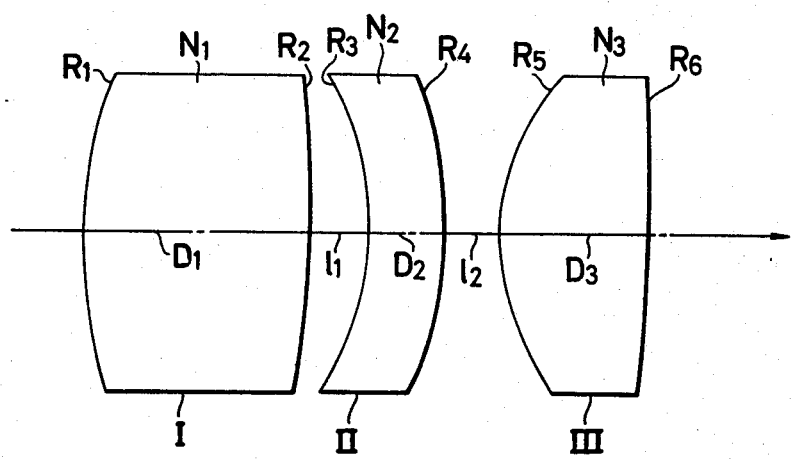
FIG. 1 is a cross-sectional view to show an example of a lens system having high resolving power according to the present invention.
Figure 2:
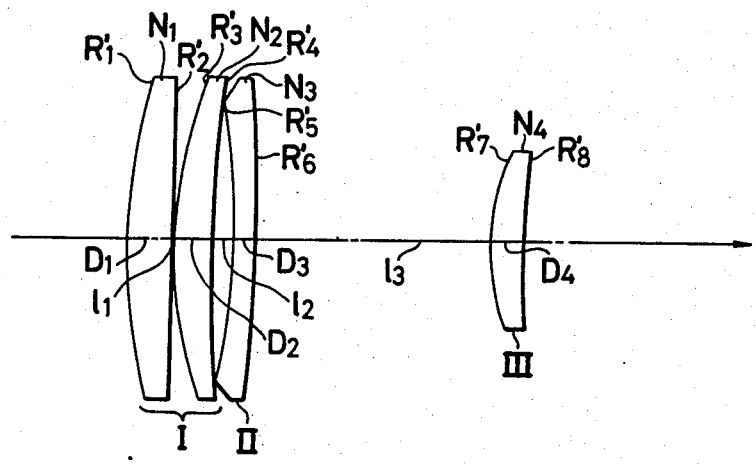
FIG. 2 is a cross-sectional view to show another example of a lens system having high resolving power according to the present invention.

FIG. 1 and FIG. 2 are cross-sectional views to show example of a lens system according to the present invention, showing the examples to be described later, enlarging the same by 5 times. The lens systems shown therein have a first positive lens group I of convergent type, a second negative lens II of divergent type, and a third positive lens III of convergent type being positioned in said order from an object side.

The lens system shown in FIG. 1 and the lens system shown in FIG. 2 are different in their set up of their respective first positive lens group. That is in the lens system shown in FIG. 1, said first positive lens group I consists of a positive biconvex lens (R1, R2), while the first positive lens group I in the lens system shown in FIG. 2 consists of two positive meniscus lenses (R'1, R'2, R'3, R'4) having their convex surfaces facing an object side. Further the second negative lens II is a negative meniscus lens (R'5, R'6) having its concave surface facing an object side, while the third positive lens III is a positive lens (R'7, R'8) having its convex surface facing to an object side.

When the distance on the optical axis between the second negative lens II and the thid positive lens III is represented by L (l2, l3), and the radius of curvature of the third positive lens III at its surface at an object side is represented by R(R5, R'7), such condition as expressed by an inequality, $R/L > 0.8$ is satisfied. If this condition is not satisfied, a total length of the lens system becomes long, increasing the weight of the total system, thus such object as providing a light weight lens becomes difficult to be achieved. Further, in the lens systems shown in FIG. 1 and FIG. 2, when the radius of curvature of the third positive lens at its surface at an image plane side is represented by Rb (R6, R'8), and the focal distance of the total lens system is represented by F, such conditions as expressed by an inequality, $-0.18/F < 1/Rb < 0.18/F$ is not satisfied. If the value of 1/Rb falls outside of the upper limit or the lower limit of said condition, the sine condition will not be satisfied.

The above mentioned arrangement is so set up that the value of refractive index of the first positive lens group I is made as large as possible and the radius of curvature of the surface of lens is also made as large as possible so that the spherical aberration generated at the first positive lens group is held down to as low level as possible.

Therefore said reduced spherical aberration can be corrected at the concave surface of the negative meniscus lens of the second negative lens II, also it is possible to satisfy the sine condition with said concave surface of the second negative lens II and the plane of the third positive lens III at an image plane side.

Here, when the radius of curvature of the concave surface (R3 or R'5) of the second negative lens II is represented by Ra, and the refractive index of said lens is represented by Na, while the focal distance of the total system is represented by F, the following inequality is satisfied when the first positive lens group I is made of one piece of lens as shown in FIG. 1:

$$-0.6/F < (Na - 1/Ra) < -0.4/F$$

and the following inequality is satisfied when the first positive lens group I is made of two pieces of lenses as shown in FIG. 2:

$$-0.25/F < (Na-1/Ra) < -0.2/F$$

If the value of (Na−1/Ra) is below the lower limit of said conditional inequality, the refractive function of the surface of the second negative lens II at an object side becomes excessively strong thus the spherical aberration is over corrected. Also if the same is above the upper limit of said conditional inequality, it becomes difficult to satisfy the sine condition and at a same time to correct spherical aberration.

Now examples of the present invention will be shown, wherein Examples 1 to 3 show cases in which the first positive lens group I consists of one piece of lens having a positive refractive power, and the example 4 constitutes a modification thereof, in which the first positive lens group I is made of two pieces of meniscus lenses having positive refractive power. And optical glass having as high refractive index as 1.8 is used as material for said first positive lens group I.

Figure 3:
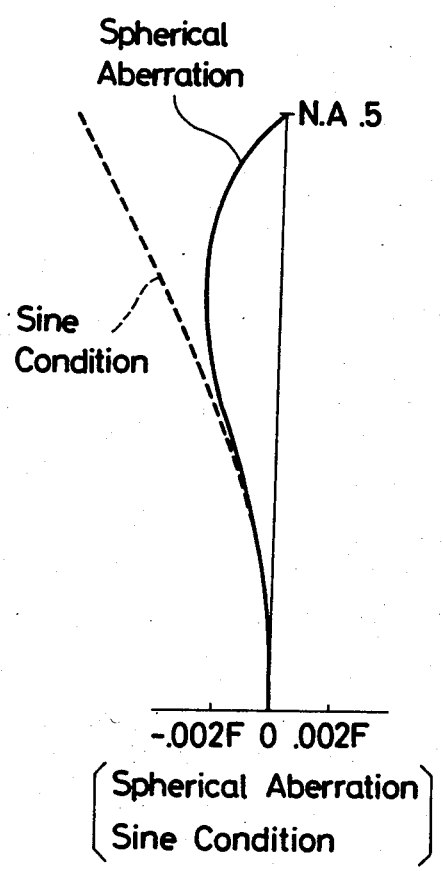
FIG. 3 is an aberration diagram to show the spherical aberration and the sine condition of the lens system shown in FIG. 1.
Figure 4:
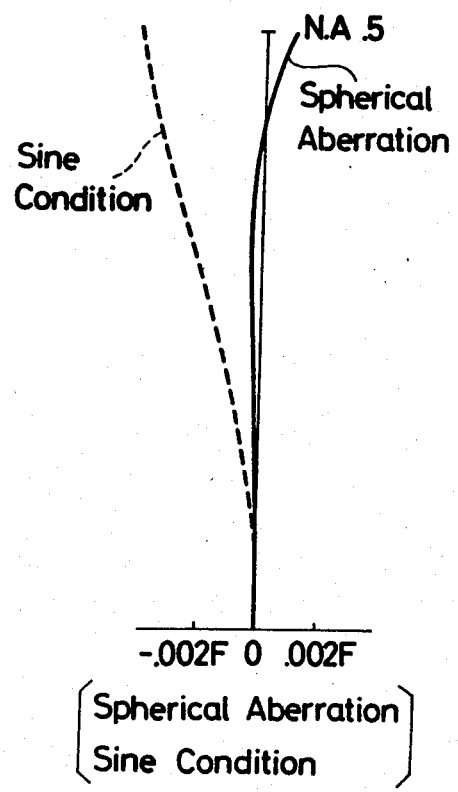
FIG. 4 is an aberration diagram to show the spherical aberration and the sine condition of the lens system shown in FIG. 2.

Table 1 shows the aberration coefficients in the Examples 1 to 4. Also FIG. 1 and FIG. 2 are cross-sectional views of the lenses of the Example 2 and the Example 4, respectively, to be described later, while FIG. 3 and FIG. 4 are aberration diagrams to show the spherical aberration and the sine condition of the lenses described in the Example 2 and the Example 4, respectively. In this case an object point is supposed to be at infinite position and the position of incident pupil is at a position of 15 mm from the surface (R1, R'1) of the first lens toward an object side. Also in the Examples, f represent a focal distance, and N.A. represent a numerical aperture, while b. f. represents back-focus, and D represents lens thickness on optical axis, while l represents distance between lens planes on optical axis.

EXAMPLE 1

| F = 10 | N.A. = 0.5 | b.f. = 4.0986 |
|---|---|---|
| R1 = 19.33297 | D1 = 3.54922 | N1 = 1.80024 |
| R2 = −106.00698 | l1 = 1.13716 | |
| R3 = −12.05644 | D2 = 1.12640 | N2 = 1.51385 |
| R4 = −18.59293 | l2 = 5.08022 | |
| R5 = 8.01846 | D3 = 4.67280 | N3 = 1.80024 |
| R6 = 124.02474 | | |
| $\frac{R5}{l_2} = 1.5784,$ | $\frac{1}{R6} = 0.0089,$ | $\frac{N2-1}{R3} = -0.0426$ |

EXAMPLE 2

| F = 10 | N.A. = 0.5 | b.f. = 2.92267 |
|---|---|---|
| R1 = 17.44775 | D1 = 7.5 | N1 = 1.79609 |
| R2 = −47.46225 | l1 = 2.15675 | |
| R3 = −9.40820 | D2 = 2.5 | N2 = 1.51385 |
| R4 = −14.64175 | l2 = 1.90520 | |
| R5 = 8.6255 | D3 = 5. | N3 = 1.79609 |
| R6 = −63.77835 | | |
| $\frac{R5}{l_2} = 4.5273$ | $\frac{1}{R6} = -0.0157$ | $\frac{N2-1}{R3} = -0.0546$ |

EXAMPLE 3

| F = 10 | N.A. = 0.5 | b.f. = 2.75038 |
|---|---|---|
| R1 = 18.28320 | D1 = 7.5 | N1 = 1.79609 |
| R2 = −84.05195 | l1 = 1.74615 | |
| R3 = −10.46215 | D2 = 2.5 | N2 = 1.51385 |
| R4 = −14.70660 | l2 = 3.4916 | |
| R5 = 7.06950 | D3 = 5. | N3 = 1.79609 |
| R6 = 62.92920 | | |
| $\frac{R5}{l_2} = 2.0247$ | $\frac{1}{R6} = 0.0159$ | $\frac{N2-1}{R3} = -0.0491$ |

EXAMPLE 4

| F = 10 | N.A. = 0.5 | b.f. = 3.11167 |
|---|---|---|
| R'1 = 21.422 | D1 = 1.49 | N1 = 1.80024 |
| R'2 = 202.96 | l1 = 0.1 | |
| R'3 = 15.39 | D2 = 1.18 | N2 = 1.80024 |
| R'4 = 67.615 | l2 = 0.57 | |
| R'5 = −27.283 | D3 = 0.73 | N3 = 1.61974 |
| R'6 = −95.897 | l3 = 7.95 | |
| R'7 = 6.718 | D4 = 1.2 | N4 = 1.80024 |
| R'8 = 57.145 | | |
| $\frac{R'7}{l_3} = 0.8450$ | $\frac{1}{R'8} = 0.0175$ | $\frac{N3-1}{R5} = -0.0227$ |

Table 1

| Aberration Coefficient | Aberration Coefficient | | | |
|---|---|---|---|---|
| | Example 1 | Example 2 | Example 3 | Example 4 |
| I | 0.02805 | 0.07080 | 0.02563 | 0.01786 |
| II | −0.00157 | 0.00870 | −0.03666 | −0.05242 |
| III | 0.23905 | −0.09053 | −0.08174 | −0.24878 |
| P | 0.69141 | 0.80182 | 0.75806 | 0.89708 |
| V | 4.21858 | 2.63346 | 3.46139 | 1.64054 |
| I* | −0.56119 | −0.69768 | −0.52966 | −0.35172 |
| II* | −0.05311 | −0.97010 | −0.56807 | −0.20590 |
| IF | 1.56429 | −0.63556 | 0.08864 | 0.04652 |
| IIP | 4.31667 | 0.73498 | 1.35204 | −0.07053 |
| I$^A$ | 2.32985 | −0.37154 | 0.53698 | 0.12552 |
| II$^A$ | 7.08637 | 2.57769 | 4.25909 | 1.74245 |
| III$^A$ | 14.79254 | 8.97284 | 10.17215 | 1.86330 |
| IV$^A$ | 16.90688 | 11.18343 | 15.37715 | 6.00424 |
| V$^A$ | 29.20586 | 23.40850 | 27.81854 | −8.13303 |

Symbols for Aberration Coefficient:
I : spherical aberration,
II: coma,
III: astigmatism,
P: Petzval sum,
V: distortion,
I* : ring belt spherical aberration,
II* : coma,
IF: feather shape aberration,
IIP: arrow shape aberration,
I$^A$: peripheral spherical aberration,
II$^A$: peripheral coma,
III$^A$: peripheral astigmatism,
IV$^A$: spherical field of curvature at periphery,
V$^A$: peripheral distortion.

What is claimed is

1. A lens system having a high resolving power and object and image ends, comprising, in order from the object end, a first double convex lens, a second negative meniscus lens having its concave surface facing the object and a third positive lens having its convex surface facing the object end, the lens system satisfying the relation:

$$-0.18/F < 1/Rb < 0.18/F$$

$$-0.6/F < (Na-1/Ra) < -0.4/F$$

wherein Ra is the radius of curvature of the surface of said second negative meniscus lens on the image end of the lens system, Rb the radius of curvature of the surface of said third positive lens on the image end, F the focal distance of the total lens system and Na the refractive index of said second meniscus lens.

2. A lens system having a high resolving power and object and image ends, comprising: a first positive lens group including two positive meniscus lenses having their convex surfaces facing to the object end, a second negative meniscus lens having its concave surface facing to the object end and a third positive lens having its convex surface facing to the object end, all in order from the object end, the lens system satisfying the following relation:

$$-0.18/F < 1/Rb < 0.18/F$$

$$-0.25/F < (Na - 1/Ra) < -0.2/F$$

wherein Ra represents the radius of curvature of the surface of said second negative meniscus lens on the image end of the lens system, Rb the radius of curvature of the surface of said third positive lens on the image end, F the focal distance of the total lens system and Na the refractive index of said second meniscus lens.

3. A high resolving power lens system with an object end and an image end, comprising a first positive lens group including a positive lens, a second negative lens which is a negative meniscus lens having its concave surface facing the object end and a third positive lens having its convex surface facing the object end all positioned in order from the object end, said system having an air space L on optical axis between said second negative lens and said third positive lens and a radius of curvature R of the surface of the third positive lens from the object end, wherein $0.8 < R/L$, and $-0.18/F < 1/Rb < 0.18/F$, and wherein Ra is the radius of curvature of the surface of said third positive lens at the image end and F the focal distance of the total system, said first positive lens consisting of a one-piece double convex lens, and the inequality, $$-0.6/F < (Na - 1/Ra) < -0.4/F$$

is satisfied when the radius of curvature of said second negative lens at an image plane side is represented by Ra and the refractive index of the second negative lens is represented by Na, in which the surface of said third positive lens at the image plane side is concave relative to the image plane, and the following data are satisfied:

| F = 10, | NA = 0.5, | bf = 4.0986 |
|---|---|---|
| R1 = 19.33297 | D1 = 3.54922 | N1 = 1.80024 |
| R2 = −106.00698 | l1 = 1.13716 | |
| R3 = −12.05644 | D2 = 1.12640 | N2 = 1.51385 |
| R4 = −18.59293 | l2 = 5.08022 | |
| R5 = 8.01846 | D3 = 4.67280 | N3 = 1.80024 |
| R6 = 124.02474 | | |
| $\frac{R5}{l2} = 1.5784$, | $\frac{1}{R6} = 0.0089$, | $\frac{N2-1}{R3} = -0.0426$ | wherein R1, R2, ... are the successive radii of curvature from the object end, D1, D2, the successive axial lens thickness from the object end, $l_1, l_2, \ldots$ the successive lens spacings from the object end, N1, N2, ... the successive refractive indexes of the lenses from the object end, bf the back focus of the lens system, NA the number of lens apertures and F the focal length of the whole system.

4. A high resolving power lens system with an object end and an image end, comprising a first positive lens group including a positive lens, a second negative lens which is a negative meniscus lens having its concave surface facing the object end and a third positive lens having its convex surface facing the object end all positioned in order from the object end, said system having an air space L on optical axis between said second negative lens and said third positive lens and a radius of curvature R of the surface of the third positive lens from the objct end, wherein $0.8 < R/L$, and $-0.18/F < 1/Rb < 0.18/F$, and wherein Rd is the radius of curvature of the surface of said thrd positive lens at the image end and F the focal distance of the total system, said first positive lens consisting of a one-piece double convex lens, and the inequality, $$-0.6/F < (Na - 1/Ra) < -0.4/F$$

is satisfied when the radius of curvature of said second negative lens at an image plane side is represented by Ra and the refractive index of the second negative lens is represented by Na, in which the surface of said third positive lens at the image plane end is concave relative to the image plane and the following data are satisfied:

| F = 10, | NA = 0.5, | bf = 2.75038 |
|---|---|---|
| R1 = 18.28320 | D1 = 7.5 | N1 = 1.79609 |
| R2 = −84.05195 | l1 = 1.74615 | |
| R3 = −10.46215 | D2 = 2.5 | N2 = 1.51385 |
| R4 = −14.70660 | l2 = 3.4916 | |
| R5 = 7.06950 | D3 = 5. | N3 = 1.79609 |
| R6 = 62.92920 | | |
| $\frac{R5}{l2} = 2.0247$, | $\frac{1}{R6} = 0.0159$, | $\frac{N2-1}{R3} = -0.0491$ | wherein R1, R2, ... are the successive radii of curvature from the object end, D1, D2, the successive axial lens thickness from the object end, $l_1, l_2, \ldots$ the successive lens spacings from the object end, N1, N2, ... the successive refractive indexes of the lenses from the object end, bf the back focus of the lens system, NA the number of lens apertures and F the focal length of the whole system.

5. A high resolving power lens system with an object end and an image end, comprising a first positive lens group including a positive lens, a second negative lens which is a negative meniscus lens having its concave surface facing the object end and a third positive lens having its convex surface facing the object end all positioned in order from the object end, said system having an air space L on optical axis between said second negative lens and said third positive lens and a radius of curvature R of the surface of the third positive lens from the object end, wherein $0.8 < R/L$, and $-0.18/F < 1/Rb < 0.18/F$, and wherein Rd is the radius of curvature of the surface of said third positive lens at the image end and F the focal distance of the total system, said first positive lens consisting of a one-piece double convex lens, and the inequality, $$-0.6/F < (Na - 1/Ra) < -0.4/F$$

is satisfied when the radius of curvature of said second negative lens at an image plane side is represented by Ra and the refractive index of the second negative lens is represented by Na, in which the surface of said third positive lens at the image plane end is concave relative to the image plane, and the following data are satisfied:

| F = 10, | NA = 0.5 | bf = 2.92267 |
|---|---|---|
| R1 = 17.44775 | D1 = 7.5 | N1 = 1.79609 |
| R2 = −47.46225 | l1 = 2.15675 | |
| R3 = −9.40820 | D2 = 2.5 | N2 = 1.51385 |
| R4 = −14.64175 | l2 = 1.90520 | |
| R5 = 8.6255 | D3 = 5. | N3 = 1.79609 |
| R6 = −63.77835 | | |
| $\frac{R5}{l2} = 4.5273$, | $\frac{1}{R6} = -0.0157$, | $\frac{N2-1}{R3} = -0.0546$ | wherein R1, R2, . . . are the successive radii of curvature from the object end, D1, D2, the successive axial lens thickness from the object end, $l_1, l_2, \ldots$ the successive lens spacings from the object end, N1, N2, . . . the successive refractive indexes of the lenses from the object end, bf the back focus of the lens system, NA the number of lens apertures and F the focal length of the whole system.

6. A high resolving power lens system with an object end and an image end, comprising a first positive lens group including a positive lens, a second negative lens which is a negative meniscus lens having its concave surface facing the object end and a third positive lens having its convex surface facing the object end all positioned in order from the object end, said system having an air space L on optical axis between said second negative lens and said third positive lens and a radius of curvature R of the surface of the third positive lens from the object end, wherein 0.8 < R/L, and − 0.18/F < 1/Rb < 0.18/F, and wherein Rd is the radius of curvature of the surface of said third positive lens at the image end and F the focal distance of the total system, said first positive lens group having two positive meniscus lenses having their convex surfaces facing the object end, and an inequality, − 0.25/F < (Na−1/Ra) < − 0.2/F, is satisfied when the radius of the second negative lens at the image plane side is represented by Ra and the refractive index of the second negative lens is represented by Na, in which the surface of said third positive lens at the image plane side is concave relative to the image plane, and the following date are satisfied:

| F = 10, | NA = 0.5, | bf = 3.11167 |
|---|---|---|
| R′1 = 21.422 | D1 = 1.49 | N1 = 1.80024 |
| R′2 = 202.96 | l1 = 0.1 | |
| R′3 = 15.39 | D2 = 1.18 | N2 = 1.80024 |
| R′4 = 67.615 | l2 = 0.57 | |
| R′5 = −27.283 | D3 = 0.73 | N3 = 1.61974 |
| R′6 = −95.897 | l3 = 7.95 | |
| R′7 = 6.718 | D4 = 1.2 | N4 = 1.80024 |
| R′8 = 57.145 | | |
| $\frac{R'7}{l3} = 0.8450$, | $\frac{1}{R'8} = 0.0175$, | $\frac{N3-1}{R'5} = -0.0227$. | wherein R′1, R′2, . . . are the successive radii of curvature from the object end, D1, D2, the successive axial lens thickness from the object end, $l_1, l_2, \ldots$ the successive lens spacings from the object end, N1, N2, . . . the successive refractive indexes of the lenses from the object end, bf the back focus of the lens system, Na the number of lens apertures and F the focal length of the whole system.

* * * * *

UNITED STATES PATENT OFFICE
CERTIFICATE OF CORRECTION

Patent No. 4,139,267                    Dated February 13, 1979

Inventor(s)   KAZUO MINOURA

It is certified that error appears in the above-identified patent and that said Letters Patent are hereby corrected as shown below:

The formulae in column 3 line 5, column 4 line 64, column 5 line 40, column 6 line 15, and column 6 line 60, should all read:

-- $-0.6/F < (Na - 1)Ra < -0.4/F$ --.

The formulae in column 3 line 10, column 5 line 15, and column 8 lines 3 and 4, should all read:

-- $-0.25/F < (Na - 1)Ra < -.2/F$ --.

Signed and Sealed this

Thirtieth Day of October 1979

[SEAL]

Attest:

RUTH C. MASON
Attesting Officer

LUTRELLE F. PARKER
Acting Commissioner of Patents and Trademarks